United States Patent
Gao et al.

(10) Patent No.: US 12,530,373 B2
(45) Date of Patent: Jan. 20, 2026

(54) DATA SYNCHRONIZATION USING TRANSACTION IDENTIFICATIONS WITHIN OBJECTS

(71) Applicant: Oracle International Corporation, Redwood Shores, CA (US)

(72) Inventors: Chen Gao, Issaquah, WA (US); Yiyan Yang, Cupertino, CA (US); Guangkun Li, Lynnwood, WA (US); Wei Li, Bothell, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/811,147

(22) Filed: Aug. 21, 2024

(65) Prior Publication Data

US 2025/0371030 A1    Dec. 4, 2025

Related U.S. Application Data

(60) Provisional application No. 63/654,419, filed on May 31, 2024.

(51) Int. Cl.
*G06F 16/27* (2019.01)
*G06F 11/14* (2006.01)

(52) U.S. Cl.
CPC ........ *G06F 16/273* (2019.01); *G06F 11/1464* (2013.01); *G06F 11/1471* (2013.01)

(58) Field of Classification Search
CPC . G06F 16/273; G06F 11/1464; G06F 11/1471
See application file for complete search history.

(56) References Cited

U.S. PATENT DOCUMENTS

| | | | |
|---|---|---|---|
| 2021/0011822 A1* | 1/2021 | Daida | G06F 3/0659 |
| 2022/0129483 A1* | 4/2022 | Duan | G06F 16/2386 |
| 2024/0256569 A1* | 8/2024 | Müller | G06F 16/2379 |

* cited by examiner

*Primary Examiner* — Apu M Mofiz
*Assistant Examiner* — Cindy Nguyen
(74) *Attorney, Agent, or Firm* — Invoke

(57) ABSTRACT

Techniques for data synchronization using transaction identifications within objects are disclosed. In some embodiments, a method comprises the following: executing a first data synchronization process for synchronizing data objects comprising corresponding transaction identifications (IDs) from a source data repository to a destination data repository, wherein an interruption occurs in the first data synchronization process; identifying a first transaction ID for the first data synchronization process that was last processed prior to the interruption; identifying a second transaction ID that is subsequent to the first transaction ID in a sequence of transaction IDs; identifying a second set of one or more data objects that each comprise the second transaction ID; and executing a second data synchronization process for synchronizing the second set of one or more data objects by copying the second set of one or more data objects from the source data repository to the destination data repository.

20 Claims, 5 Drawing Sheets

DATA SYNCHRONIZATION USING TRANSACTION IDENTIFICATIONS WITHIN OBJECTS

INCORPORATION BY REFERENCE; DISCLAIMER

Each of the following applications are hereby incorporated by reference: Application No. 63/654,419, filed May 31, 2024. The applicant hereby rescinds any disclaimer of claims scope in the parent application(s) or the prosecution history thereof and advises the USPTO that the claims in the application may be broader than any claim in the parent application(s).

TECHNICAL FIELD

The present disclosure relates to data synchronization. In particular, the present disclosure relates to data synchronization using transaction identifications that are stored within data objects.

BACKGROUND

Data synchronization is the process of establishing consistency between source and destination data stores as well as the continuous harmonization of the data over time.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
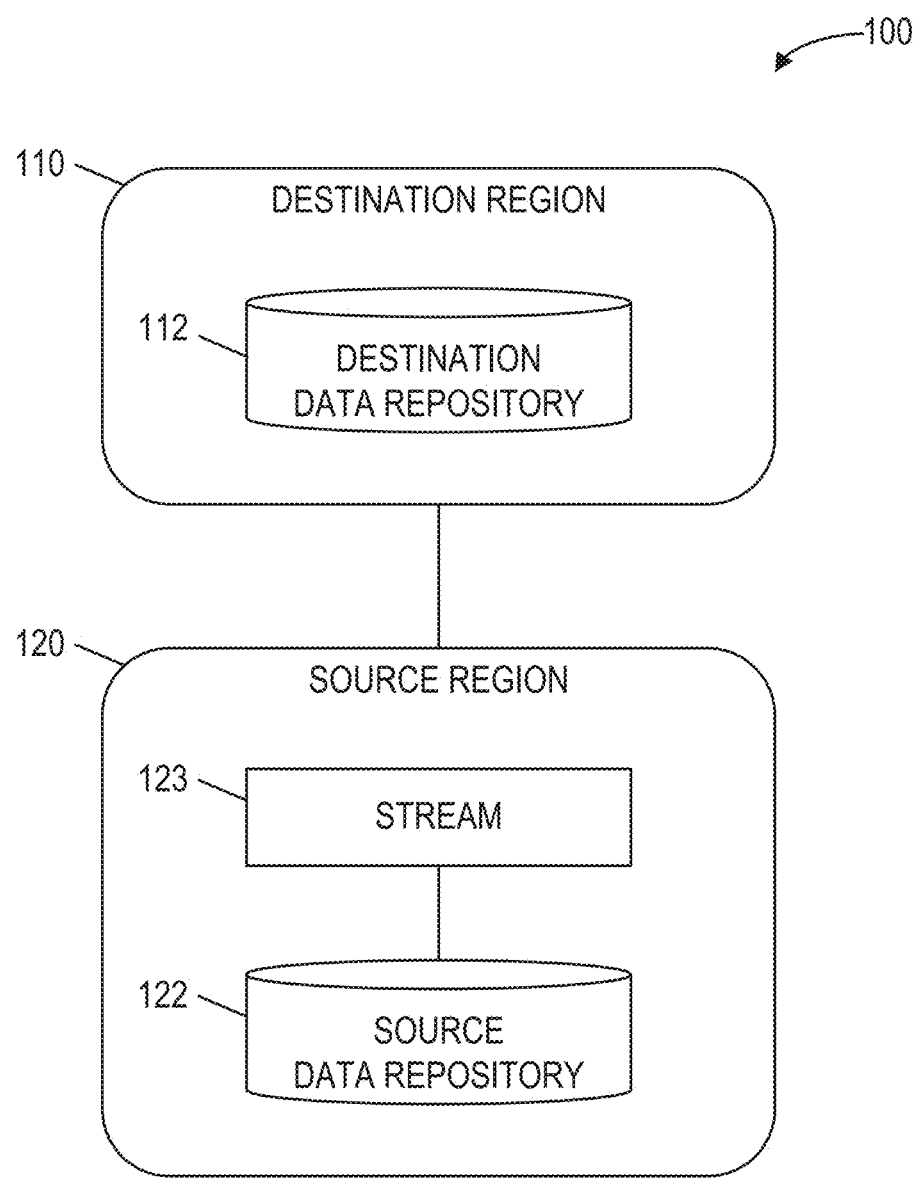
FIG. 1 illustrates a data synchronization system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. DATA SYNCHRONIZATION ARCHITECTURE
3. DATA SYNCHRONIZATION USING TRANSACTION IDENTIFICATIONS WITHIN DATA OBJECTS
4. EXAMPLE EMBODIMENT
5. COMPUTER NETWORKS AND CLOUD NETWORKS
6. HARDWARE OVERVIEW
7. MISCELLANEOUS; EXTENSIONS

1. GENERAL OVERVIEW

One or more embodiments select objects to copy from a source data repository to a destination repository based on transaction identifiers (IDs) that correspond to transactions that created or last-modified the objects. The transaction ID may be stored in each object that has been generated or last-updated by a transaction corresponding to the transaction ID. Alternatively, the transaction ID may be stored separately in a mapping between transactions IDs for transactions and object IDs for objects that have been generated or last-updated by the transactions. In an example, the system identifies a next set of objects to be copied from a source data repository to a destination repository based on a next transaction ID that is to be processed in a sequence of transaction IDs. Based on the next transaction ID that is to be processed, the system identifies each of a particular set of one or more objects that were generated by or last-updated by a transaction that corresponds to that next transaction ID. The system then copies the particular set of objects from the source data repository to a destination data repository.

In an example, a system executes a data synchronization process for synchronizing data objects from a source data repository to a destination data repository. Initially, the data synchronization process may include either copying data objects from a source data repository to a destination data repository, or executing the same transactions on the destination data repository that are executed on the source data repository. When the data synchronization process is interrupted, the system identifies a transaction ID that was last-processed prior to the interruption. The last-processed transaction ID corresponds to a transaction that created or last-updated a set of objects that were successfully synchronized from the source data repository to the destination data repository prior to the interruption. The system then determines a target transaction ID that is subsequent to the last-processed transaction ID in a sequence of transaction IDs. The system resumes the interrupted data synchronization process or initiates a new data synchronization process starting with each of a target set of objects that were either generated by or last-updated by a target transaction that corresponds to the target transaction ID. The target transaction ID may be stored within the target set of objects. In this scenario, the system may execute a query to identify the target set of objects, from a set of objects stored in the source data repository, based on each of the target set of objects including the target transaction ID. Once identified, each of the target set of objects are copied from the source data repository to the target data repository.

One or more embodiments synchronize a destination data repository with a source repository using transaction IDs while switching from (a) synchronizing objects by executing the same transactions in the source data repository and the destination data repository to (b) synchronizing objects by copying objects from the source data repository to the destination data repository.

In an example, a data synchronization system may initially synchronize objects by executing the same transactions in both the source data repository and the destination data repository. The synchronization process may be interrupted for a period of time such that a set of transactions that have been executed on the source data repository during the period of time, have not been executed on the destination data repository. Furthermore, this set of transactions (that have been executed in the source data repository but not the destination data repository) may no longer be available or may no longer be executable on the destination data repository. Accordingly, the data synchronization system may be unable to continue to synchronize objects by executing the same transactions in both the source data repository and the destination data repository. Additionally, or alternatively, it may be inefficient or time consuming to resume synchronizing the objects by executing the set of transactions on the destination data repository that have been executed on the source data repository. In such a scenario, the data synchronization system switches from (a) synchronizing objects by executing the same transactions in the source data repository and the destination data repository (prior to interruption) to (b) synchronizing objects by copying objects from the source data repository to the destination data repository (subsequent to the interruption). The system identifies a last-executed transaction that was executed on both the source data repository and the destination data repository. The system then identifies a target transaction that is subsequent to the last-executed transaction based on a sequence of transaction IDs. The target transaction and transactions subsequent to the target transaction are transactions that have been executed on the source data repository but not on the destination data repository. The system identifies the particular set of objects that have been generated by or last-updated by the target transaction. The system copies the particular set of objects from the source data repository to the target data repository. Furthermore, the system copies addition objects from the source data repository to the target data repository that have been generated by or last-updated by other transactions that are identified subsequent to the target transaction in a sequence of transaction IDs.

One or more embodiments described in this Specification and/or recited in the claims may not be included in this General Overview section.

2. DATA SYNCHRONIZATION ARCHITECTURE

FIG. 1 illustrates a data synchronization system 100 in accordance with one or more embodiments. As illustrated in FIG. 1, data synchronization system 100 includes a destination region 110, within which a destination data repository 112 is implemented, and a source region 120, within which a source data repository 122 and a stream 123 are implemented. In some embodiments, the destination region 110 and the source region 120 each include a corresponding geographical location where computing resources are hosted. For example, the destination region 110 may include a first data center that hosts the destination data repository 112, and the source region 120 may include a second data center, geographically separate from the first data center, that hosts the source data repository 122 and the stream 123. In one or more embodiments, the data synchronization system 100 may include more or fewer components than the components illustrated in FIG. 1. The components illustrated in FIG. 1 may be local to or remote from each other. The components illustrated in FIG. 1 may be communicatively coupled to each other via a direct connection or via a network. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 5, titled "Computer Networks and Cloud Networks."

In one or more embodiments, the destination data repository 112 and the source data repository 122 may each be any type of storage unit and/or device (e.g., a file system, database, collection of tables, or any other storage mechanism) for storing data. Furthermore, the destination data repository 112 and the source data repository 122 may each include multiple different storage units and/or devices. The multiple different storage units and/or devices may or may not be of the same type or located at the same physical site.

In an embodiment, the stream 123 includes a data structure in which a collection of messages is maintained in a sequence. Messages may be added at one end of the sequence and removed at the other end of the sequence. For example, the stream 123 may include a queue that uses a message processing algorithm (e.g., "first in, first out") to process the messages. The messages may include information about transactions executed on the source data repository 120. A transaction is a unit of work performed within a data management system against a data repository. For example, a transaction may include a logical, atomic unit of work that contains one or more structured query language (SQL) statements. A transaction may group SQL statements or other instructions to be executed on a data repository, so they are either all committed (e.g., applied to the source data repository 120) or all rolled back (e.g., undone from the source data repository 120). In an embodiment, the source data repository 120 assigns transactions a unique identifier, called a transaction ID.

In one or more embodiments, the destination region 110 and the source region 120 refer to hardware and/or software configured to perform operations described herein for performing data synchronization using transaction IDs that are stored within data objects. Examples of operations for performing data synchronization using transaction IDs stored within data objects are described below with reference to FIG. 2.

In an embodiment, the destination region 110 and the source region 120 are each implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

3. DATA SYNCHRONIZATION USING TRANSACTION IDENTIFICATIONS WITHIN DATA OBJECTS

Figure 2:
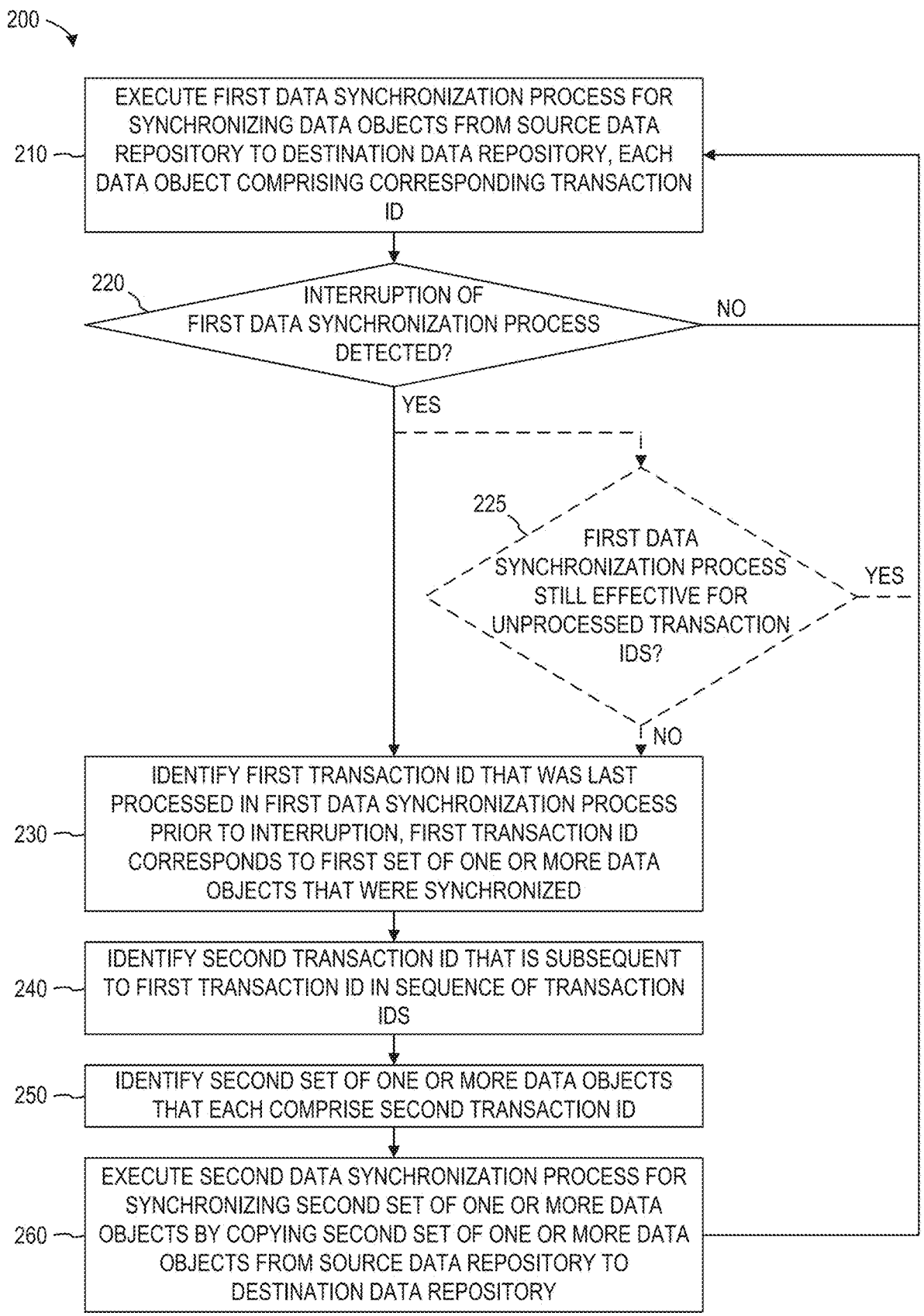
FIG. 2 illustrates an example set of operations for data synchronization using transaction identifications within data objects in accordance with one or more embodiments.

FIG. 2 illustrates an example set of operations for data synchronization using transaction IDs within data objects in accordance with one or more embodiments. One or more operations illustrated in FIG. 2 may be modified, rearranged, or omitted. Accordingly, the particular sequence of operations illustrated in FIG. 2 should not be construed as limiting the scope of one or more embodiments.

In an embodiment, the data synchronization system 100 executes a first data synchronization process for synchronizing data objects from the source data repository 122 to the destination data repository 112 (Operation 210). The first data synchronization process may include executing a same set of transactions on the destination data repository 112 that were executed on the source data repository 122. For example, a record of each transaction that is executed on the source data repository 122 may be stored in the stream 123, where the details of each transaction may be accessed for execution on the destination data repository 112 as part of the first data synchronization process. Alternatively, the first data synchronization process may use data replication, where the data objects are copied from the source data repository 122 to the destination data repository 112.

In one or more embodiments, each particular data object of the data objects being synchronized from the source data repository 122 to the destination data repository 112 comprises a corresponding particular transaction ID corresponding to a transaction that last updated or generated the particular data object. The corresponding particular transaction ID of each particular data object is not unique to the particular data object. Rather, each particular data object may be comprised in two or more data objects. For example, in a situation in which a single transaction included inserting a row into Table A and deleting a row from Table D, the Table A data object and the Table D data object may each include the same transaction ID corresponding to the single transaction.

Additionally, each particular data object may further comprise an object ID that is different from the transaction ID of that particular data object and is unique in an object group that comprises that particular data object. For example, if there are ten-thousand data objects stored in the source data repository 122, then there would be ten-thousand unique object IDs since each one of the ten-thousand data objects would have its own unique object ID that is distinct from every one of the other data objects in that group of ten-thousand data objects.

Figure 3:
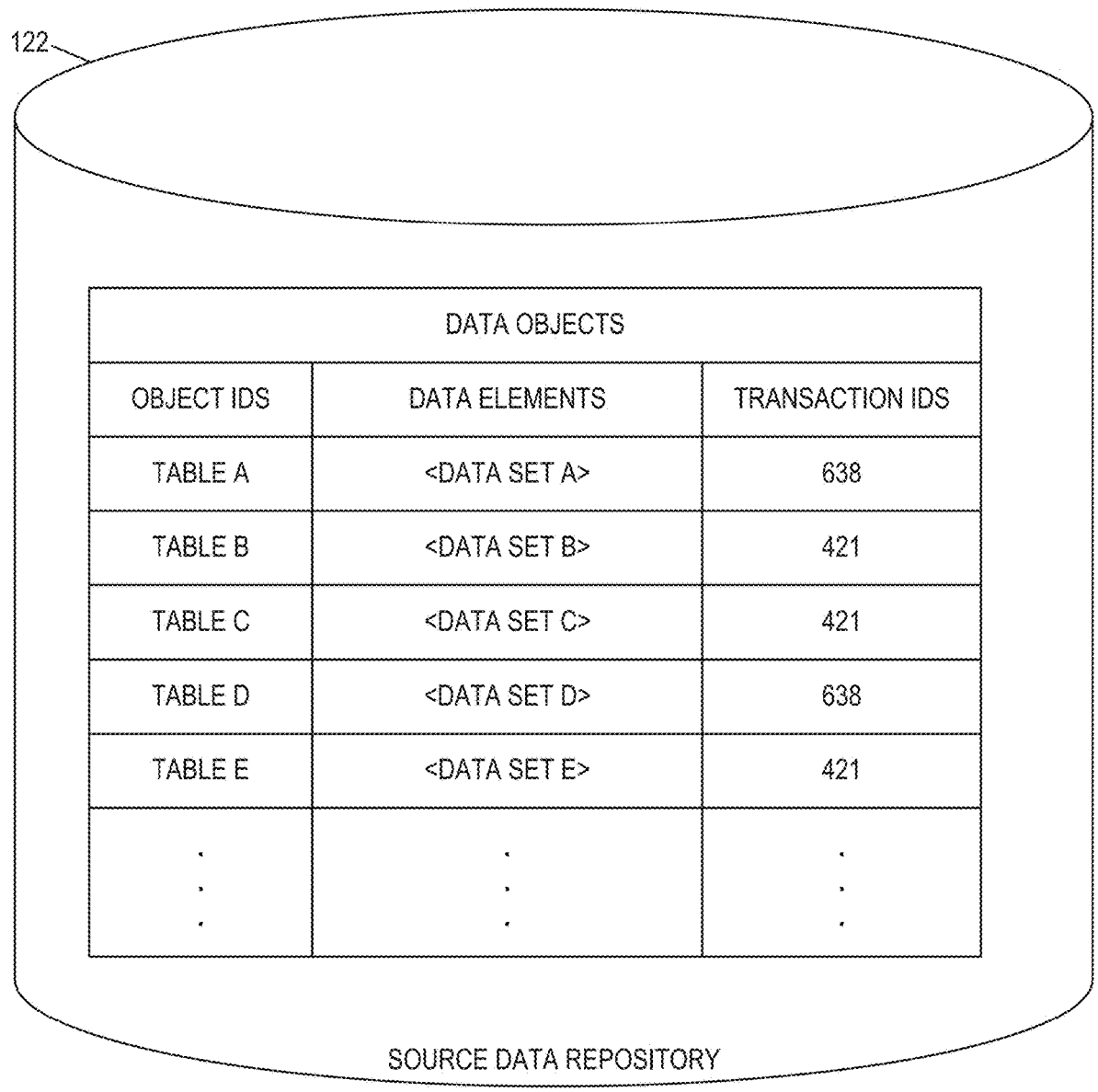
FIG. 3 illustrates an example embodiment of a source data repository in accordance with one or more embodiments.

FIG. 3 illustrates an example embodiment of the source data repository 122 in accordance with one or more embodiments. In the example shown in FIG. 3, the source data repository 122 stores a plurality of data objects. Each data object may include a corresponding object ID, a corresponding set of one or more data elements, and a corresponding transaction ID. While the object IDs are unique to their corresponding data objects, the transaction IDs are not unique and may be comprised in two or more data objects. In the example shown in FIG. 3, TABLE A and TABLE D were last updated or created in the same transaction, and TABLE B, TABLE C, and TABLE E were last updated or created in the same transaction. As a result, TABLE A and TABLE D have the same transaction ID (638), and TABLE B, TABLE C, and TABLE E have the same transaction ID (421).

Referring back to FIG. 2, in an embodiment, the data synchronization system 100 determines if an interruption in the first data synchronization process has been detected (Operation 220). The interruption may result from a connection between the source data repository 122 and destination data repository 112 being terminated, such as due to a network failure. The data synchronization system 100 may detect the interruption subsequent to the connection being re-established. In some embodiments, the interruption occurs in the first data synchronization process when a first portion of the data objects from the source data repository 122 was synchronized with the destination data repository 112, but a second portion of the data objects from the source data repository 122 was not synchronized with the destination data repository 112.

If the data synchronization system 100 determines that an interruption in the first data synchronization process has not been detected, then the data synchronization system 100 may continue executing the first data synchronization process for synchronizing data objects from the source data repository 122 to the destination data repository 112 (Operation 210). In an embodiment, if the data synchronization system 100 determines that an interruption in the first data synchronization process has been detected, then the data synchronization system 100 identifies a first transaction ID for the first data synchronization process that was last processed prior to the interruption (Operation 230). The first transaction ID corresponds to a first set of one or more data objects that were synchronized from the source data repository 122 to the destination data repository 112. The data synchronization system 100 may identify the first transaction ID that was last processed prior to the interruption by scanning the transaction IDs of the data objects in the destination data repository 112 to find the most sequentially recent transaction ID in the data objects in the destination data repository 112. For example, in an embodiment in which transaction IDs are assigned using an increasing counter, where each new transaction that is executed on the source data repository 122 is assigned a number that is one greater than the previous new transaction, the data synchronization system 100 may identify the first transaction ID that was last-processed prior to the interruption by identifying the transaction ID having the highest number amongst the transaction IDs of the data object stored in the destination data repository 112. Alternatively, the data synchronization system 100 (e.g., the destination region 110 and/or the source region 120) may store the transaction ID that was most recently processed as part of the first data synchronization process. In this alternative embodiment, the data synchronization system 100 identifies the first transaction ID that was last processed prior to the interruption by directly accessing and reading the transaction ID that is currently being stored as the transaction ID that was most recently processed as part of the first data synchronization process.

In one or more embodiments, the data synchronization system 100 then identifies a second transaction ID that is subsequent to the first transaction ID in a sequence of transaction IDs (Operation 240). By identifying the second transaction ID that is subsequent to the first transaction ID in the sequence of transaction IDs, the data synchronization system 100 may determine the transaction ID that was next to be processed by the first data synchronization process just prior to the interruption of the first data synchronization process. The data synchronization system 100 may identify the second transaction ID by increasing the first transaction ID by a value of one to simulate the increasing of a counter. Alternatively, the data synchronization system 100 may identify the second transaction ID by scanning the transaction IDs of the data objects in the source data repository 122 to find the transaction ID that immediately follows the first transaction ID.

In an embodiment, the data synchronization system 100 identifies a second set of one or more data objects that each comprise the second transaction ID (Operation 250). The data synchronization system 100 may identify the second set of one or more data objects by scanning the data objects in the source data repository 122 to determine the data objects that have corresponding transaction IDs that match the second transaction ID. The data synchronization system 100 may include any of the data objects that have a corresponding transaction ID that matched the second transaction ID in the second set of one or more data objects.

In an embodiment, the data synchronization system 100 executes a second data synchronization process for synchronizing the second set of one or more data objects by copying the second set of one or more data objects from the source data repository 122 to the destination data repository 112 (Operation 260). By using the second data synchronization process instead of the first data synchronization process to resume data synchronization following the interruption, the data synchronization system 100 solves the technical problem of at least a portion of the transaction that was executed on the source data repository 122 not being processed by the first data synchronization process. For example, if a connection between the source data repository 122 and the destination data repository 112 fails and is not re-established for more than a particular period of time, at least a portion of the transactions that were executed on the source data repository 122 during the connection failure may no longer be represented in the stream 123 on which the first data synchronization process relies to synchronize data objects from the source data repository 122 to the destination data repository 112. Therefore, instead of resuming synchronization after the interruption by resuming execution of the transactions stored in the stream 123, the data synchronization system 100 may resume synchronization by bypassing the stream 123 to copy the data objects from the source data repository 122.

In some instances, the interruption of the first data synchronization process may not warrant the use of the second data synchronization process for the resumption of synchronization. As long as the stream 123 still retains the transaction IDs that were left unprocessed when the interruption occurred, then the data synchronization system 100 may resume synchronization using the first data synchronization process. However, if the data synchronization system 100 determines that any transaction ID that was left unprocessed when the interruption occurred is no longer retained in the stream 123, then the data synchronization system 100 may use the second data synchronization process instead of the first data synchronization process to resume synchronization.

In one or more embodiments, the data synchronization system 100 determines if the first data synchronization process is still effective for the transactions in the stream 123 that were left unprocessed when the interruption occurred (Operation 225). One technique that the data synchronization system 100 may use to make this determination is based on the period of time for which the interruption of the first data synchronization process occurred. Interrupting the first data synchronization process may not be long enough to warrant the use of the second data synchronization process for the resumption of synchronization. For example, if the interruption lasts thirty minutes, but the stream 123 retains transactions for twenty-four hours, then there would not be any gap between the transactions that were executed on the source data repository 122 and the transactions stored in the stream 123 when the interruption ends and synchronization resumes. Therefore, in one or more embodiments, the data synchronization system 100 determines if the first data synchronization process is still effective for the transaction in the stream 123 that were left unprocessed when the interruption occurred by determining if the period of time that the interruption occurred satisfies a minimum threshold amount of time. The minimum threshold amount of time is a non-negligible amount of time, meaning that it is not sufficient for the interruption to simply have occurred. The minimum threshold amount of time may be one second. In some example embodiments, the minimum threshold amount of time is equal to the amount of time that the stream 123 is configured to retain transactions before they are deleted or otherwise removed from the stream 123. For example, if the source region 120 is configured to remove any transaction from the stream 123 as soon as, or otherwise after, twenty-four hours has passed since the transaction was added to the stream 123, then the minimum threshold amount of time may be twenty-four hours.

Another technique that the data synchronization system 100 may use to determine if the first data synchronization process is still effective for the transactions in the stream 123 that were left unprocessed when the interruption occurred is based on the size of the stream 123 at the time that the interruption began or at the time that the interruption ended, since older transactions contained in the stream 123 may be removed or otherwise lost when the stream 123 reaches a particular size. Therefore, the data synchronization system 100 may determine if the size of the stream 123 at the time that the interruption began or at the time that the interruption ended exceeded a threshold size (e.g., 10 GB), and, based on that determination, determined if the first data synchronization process is still effective for the transactions that were in the stream 123 that were left unprocessed when the interruption occurred.

If the data synchronization system 100 determines that the first data synchronization process is still effective for the transactions in the stream 123 that were left unprocessed when the interruption occurred (e.g., if the period of time of the interruption does not satisfy the minimum threshold amount of time), then the data synchronization system 100 may continue executing the first data synchronization process for synchronizing data objects from the source data repository 122 to the destination data repository 112 (Operation 210). If the data synchronization system 100 determines that the first data synchronization process is not still effective for the transactions in the stream 123 that were left unprocessed when the interruption occurred (e.g., if the period of time of the interruption satisfies the minimum threshold amount of time), then the data synchronization system 100 may proceed with the operations for resuming the synchronization using the second data synchronization process, such as by identifying the first transaction ID for the first data synchronization process that was last processed prior to the interruption (Operation 230). In this way, the executing of the second data synchronization process for synchronizing of the second set of one or more data objects is performed based on a determination that the first data synchronization process is not still effective for synchronizing the transactions in the stream 123 that were left unprocessed when the interruption occurred.

In an embodiment, subsequent to the executing of the second data synchronization process, the data synchronization system 100 resumes execution of the first data synchronization process for synchronizing additional data objects from the source data repository to the destination data repository (Operation 210). The data synchronization system 100 may trigger the resumption of executing the first data synchronization process based on a determination that the second data synchronization process has processed all of the transaction IDs of the data objects stored in the source data repository 122 that are not stored in the stream 123. In this respect, the data synchronization system 100 may resume the first data synchronization process once it has finished using the second data synchronization process to process the transactions that were lost from the stream 123 during the interruption.

4. EXAMPLE EMBODIMENT

A detailed example is described below for purposes of clarity. Components and/or operations described below should be understood as one specific example that may not be applicable to certain embodiments. Accordingly, components and/or operations described below should not be construed as limiting the scope of any of the claims.

Figure 4:
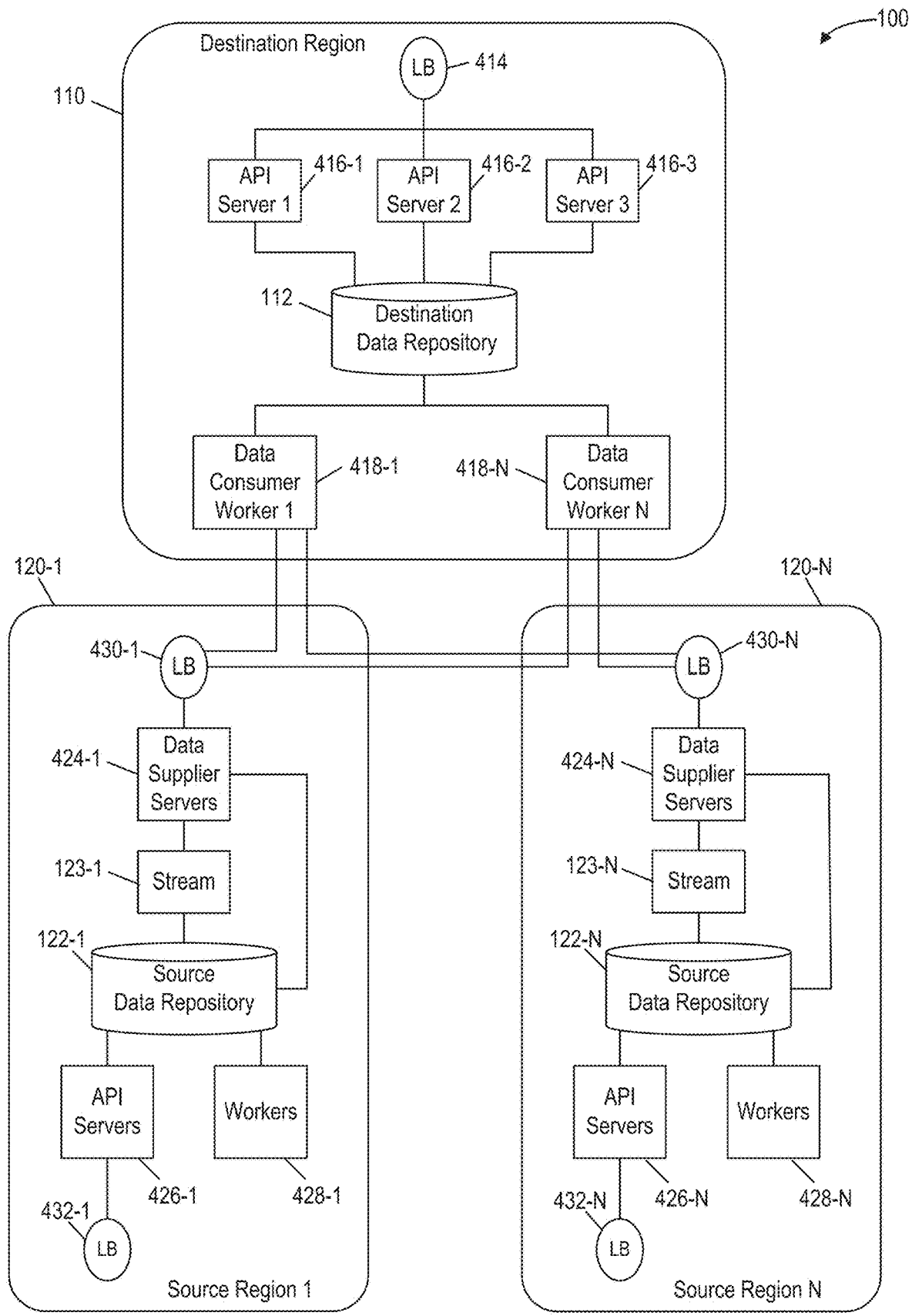
FIG. 4 illustrates an example embodiment of the data synchronization system aggregating data from multiple source data repositories across different source regions in accordance with one or more embodiments.

FIG. 4 illustrates an example embodiment of the data synchronization system 100 aggregating data from multiple source data repositories 122-1 to 122-N across different source regions 120-1 to 120-N in accordance with one or more embodiments. In the example shown in FIG. 4, the destination data repository 112 acts as a centralized data repository that aggregates data from the multiple source data repositories 122-1 to 122-N across different regions 120-1 to 120-N. The source regions 120-1 to 120-N may receive instructions to update their corresponding source data repositories 122-1 to 122-N. The instructions may be received by corresponding load balancers 432-1 to 432-N from computing devices of users. The load balancers 432-1 to 432-N may distribute the instructions amongst multiple API servers 426-1 to 426-N, and the API servers 426-1 to 426-N may execute the instructions on their corresponding source data repositories 122-1 to 122-N. Similarly, instructions to update the source data repositories 122-1 to 122-N may be received by one or more corresponding workers 428-1 to 428-N that may then execute the instructions on their corresponding source data repositories 122-1 to 122-N. In one or more embodiments, the instructions to update the source data repositories 122-1 to 122-N are executed as transactions. Records of the executed transactions may be stored on the streams 123-1 to 123-N.

In an embodiment, the destination region 110 includes a load balancer 414 configured to receive instructions from computing devices of users. The load balancer 414 may distribute the instructions amongst multiple API servers 416-1, 416-2, and 416-3. The destination region 110 may also include a plurality of data consumer workers 418-1 to 418-N. The data consumer workers 418-1 to 418-N may be configured to communicate with load balancers 430-1 to 430-N to synchronize the destination data repository 112 with the source data repositories 122-1 to 122-N. The load balancers 430-1 to 430-N may communicate with data supplier servers 424-1 to 424-N to obtain the transactions from the streams 123-1 to 123-N via the first data synchronization process or to obtain copies of data objects from the source data repositories 122-1 to 122-N via the second data synchronization process.

5. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis.

Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
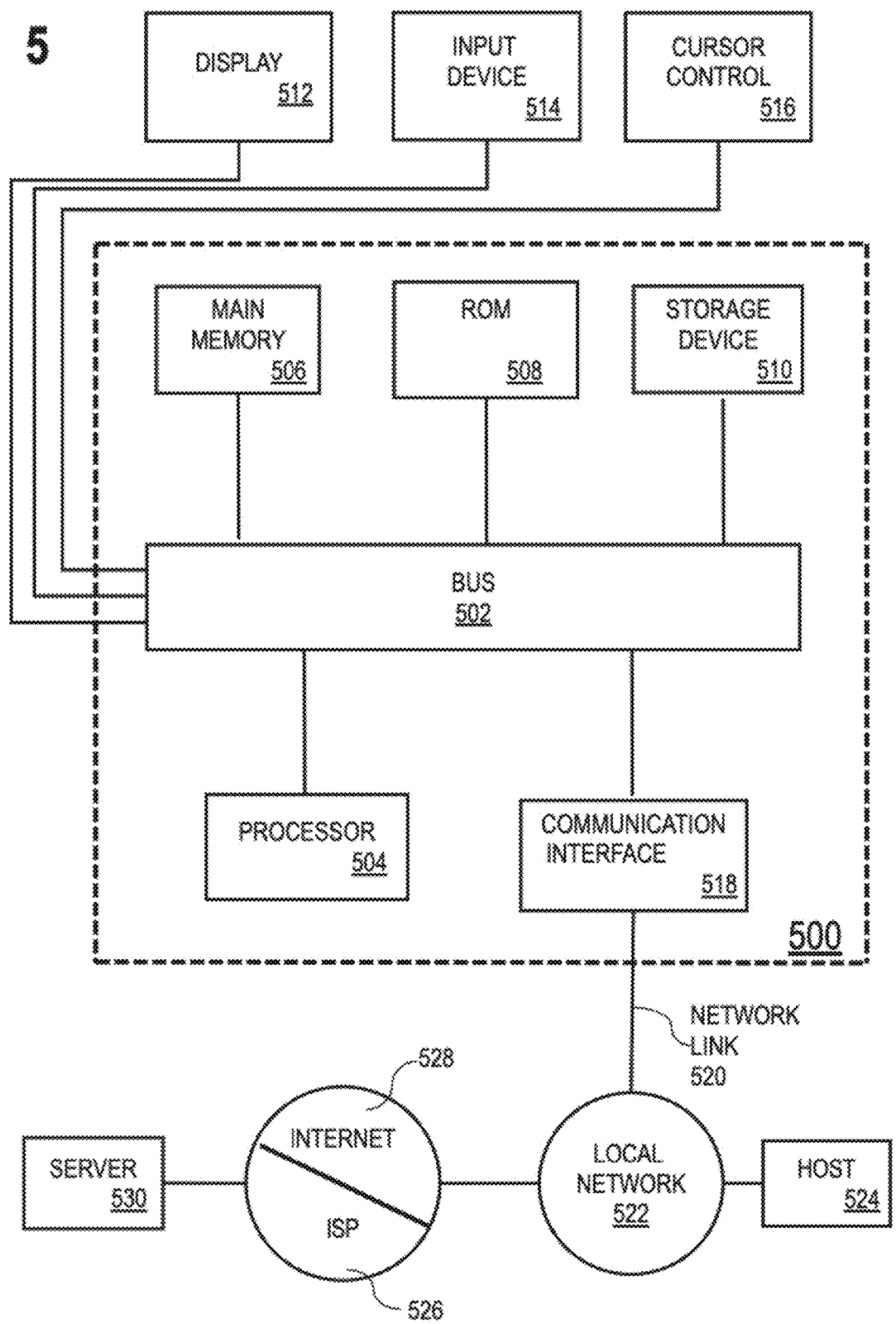
FIG. 5 shows a block diagram that illustrates a computer system in accordance with one or more embodiments.

For example, FIG. 5 is a block diagram that illustrates a computer system 500 upon which an embodiment of the disclosure may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or a Solid State Drive (SSD) is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

7. MISCELLANEOUS; EXTENSIONS

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, cause performance of operations comprising:
   executing a first data synchronization process for synchronizing data objects from a source data repository to a destination data repository,
   wherein each particular data object, of the data objects, is associated with a corresponding particular transaction identification (ID) corresponding to a particular transaction that last updated or generated the particular data object;
   wherein an interruption occurs in the first data synchronization process (a) after a first portion of the data objects from the source data repository were synchronized with the destination data repository and (b) before a second portion of the data objects from the source data repository are synchronized with the destination data repository;
   identifying a first transaction ID for the first data synchronization process that was last-processed prior to the interruption, wherein the first transaction ID corresponds to a first set of one or more data objects that were synchronized from the source data repository to the destination data repository;
   identifying a second transaction ID, for use in identifying data objects to be synchronized, based on a determination that the second transaction ID is subsequent to the first transaction ID in a sequence of transaction IDs;
   identifying a second set of one or more data objects that each comprise the second transaction ID; and
   executing a second data synchronization process for synchronizing of the second set of one or more data objects by copying the second set of one or more data objects from the source data repository to the destination data repository.

2. The non-transitory media of claim 1, wherein the particular transaction ID, corresponding to the particular transaction that last updated or generated the particular data object, is comprised within the particular data object.

3. The non-transitory media of claim 1, wherein the first portion of the data objects were synchronized prior to the interruption by executing a same set of transactions on the destination data repository that were executed on the source data repository to generate the first portion of the data objects.

4. The non-transitory media of claim 1, wherein the first portion of the data objects were synchronized prior to the interruption by copying the first portion of the data objects from the source data repository to the destination data repository.

5. The non-transitory media of claim 1, wherein the same second transaction ID is stored in two or more objects that were created or last updated by execution of a first transaction corresponding to the second transaction ID.

6. The non-transitory media of claim 1, wherein each particular data object further comprises an object identification (ID) that is different from the transaction ID of that particular data object and is unique in an object group that comprises that particular data object.

7. The non-transitory media of claim 1, wherein the interruption in the first data synchronization process results from a connection between the source data repository and destination data repository being terminated and wherein the operations further comprise detecting the interruption in the first data synchronization process, wherein the second data synchronization process is executed in response to detecting the interruption.

8. The non-transitory media of claim 1, wherein the second data synchronization synchronizes each of the second portion of the data objects from the source data repository to the destination data repository in an order that is based on (a) respective transaction IDs stored in each of the second portion of the data objects and (b) the sequence of transaction IDs.

9. The non-transitory media of claim 1, wherein the executing of the second data synchronization process for synchronizing of the second set of one or more data objects is performed based on a determination that the period of time for which the interruption occurred satisfies a minimum threshold amount of time.

10. The non-transitory media of claim 1, wherein the destination data repository comprises a centralized data repository that aggregates data from multiple source data repositories across different regions.

11. A method executed by at least one device including a hardware processor, the method comprising:
    executing a first data synchronization process for synchronizing data objects from a source data repository to a destination data repository,
    wherein each particular data object, of the data objects, is associated with a corresponding particular transaction identification (ID) corresponding to a particular transaction that last updated or generated the particular data object;

wherein an interruption occurs in the first data synchronization process (a) after a first portion of the data objects from the source data repository were synchronized with the destination data repository and (b) before a second portion of the data objects from the source data repository are synchronized with the destination data repository;

identifying a first transaction ID for the first data synchronization process that was last-processed prior to the interruption, wherein the first transaction ID corresponds to a first set of one or more data objects that were synchronized from the source data repository to the destination data repository;

identifying a second transaction ID, for use in identifying data objects to be synchronized, based on a determination that the second transaction ID is subsequent to the first transaction ID in a sequence of transaction IDs;

identifying a second set of one or more data objects that each comprise the second transaction ID; and executing a second data synchronization process for synchronizing of the second set of one or more data objects by copying the second set of one or more data objects from the source data repository to the destination data repository.

12. The method of claim 11, wherein the particular transaction ID, corresponding to the particular transaction that last updated or generated the particular data object, is comprised within the particular data object.

13. The method of claim 11, wherein the first portion of the data objects were synchronized prior to the interruption by executing a same set of transactions on the destination data repository that were executed on the source data repository to generate the first portion of the data objects.

14. The method of claim 11, wherein the first portion of the data objects were synchronized prior to the interruption by copying the first portion of the data objects from the source data repository to the destination data repository.

15. The method of claim 11, wherein the same second transaction ID is stored in two or more objects that were created or last updated by execution of a first transaction corresponding to the second transaction ID.

16. The method of claim 11, wherein each particular data object further comprises an object identification (ID) that is different from the transaction ID of that particular data object and is unique in an object group that comprises that particular data object.

17. The method of claim 11, wherein the interruption in the first data synchronization process results from a connection between the source data repository and destination data repository being terminated and wherein the operations further comprise detecting the interruption in the first data synchronization process, wherein the second data synchronization process is executed in response to detecting the interruption.

18. The method of claim 11, wherein the second data synchronization synchronizes each of the second portion of the data objects from the source data repository to the destination data repository in an order that is based on (a) respective transaction IDs stored in each of the second portion of the data objects and (b) the sequence of transaction IDs.

19. The method of claim 11, wherein the executing of the second data synchronization process for synchronizing of the second set of one or more data objects is performed based on a determination that the period of time for which the interruption occurred satisfies a minimum threshold amount of time.

20. A system comprising:
at least one device including a hardware processor;
the system being configured to perform operations comprising:
executing a first data synchronization process for synchronizing data objects from a source data repository to a destination data repository, wherein each particular data object, of the data objects, is associated with a corresponding particular transaction identification (ID) corresponding to a particular transaction that last updated or generated the particular data object;

wherein an interruption occurs in the first data synchronization process (a) after a first portion of the data objects from the source data repository were synchronized with the destination data repository and (b) before a second portion of the data objects from the source data repository are synchronized with the destination data repository;

identifying a first transaction ID for the first data synchronization process that was last-processed prior to the interruption, wherein the first transaction ID corresponds to a first set of one or more data objects that were synchronized from the source data repository to the destination data repository;

identifying a second transaction ID, for use in identifying data objects to be synchronized, based on a determination that the second transaction ID is subsequent to the first transaction ID in a sequence of transaction IDs;

identifying a second set of one or more data objects that each comprise the second transaction ID; and executing a second data synchronization process for synchronizing of the second set of one or more data objects by copying the second set of one or more data objects from the source data repository to the destination data repository.

* * * * *